A. SCHERBIUS.
EXCITATION OF DYNAMO ELECTRIC COMMUTATOR MACHINES.
APPLICATION FILED MAY 29, 1908.

1,114,534.

Patented Oct. 20, 1914.
3 SHEETS—SHEET 1.

A. SCHERBIUS.
EXCITATION OF DYNAMO ELECTRIC COMMUTATOR MACHINES.
APPLICATION FILED MAY 29, 1908.

1,114,534.

Patented Oct. 20, 1914.

Witnesses.

Inventor.
Arthur Scherbius,
Attorneys.

UNITED STATES PATENT OFFICE.

ARTHUR SCHERBIUS, OF BADEN, SWITZERLAND, ASSIGNOR TO GENERAL ELECTRIC COMPANY, A CORPORATION OF NEW YORK.

EXCITATION OF DYNAMO-ELECTRIC COMMUTATOR-MACHINES.

1,114,534.  Specification of Letters Patent.  Patented Oct. 20, 1914.

Application filed May 29, 1908. Serial No. 435,637.

*To all whom it may concern:*

Be it known that I, ARTHUR SCHERBIUS, a citizen of the Swiss Confederation, and resident of Baden, Switzerland, have invented certain new and useful Improvements in the Excitation of Dynamo-Electric Commutator-Machines, of which the following is a specification.

This invention relates to the excitation of single or polyphase alternating current commutator machines, and has for its object to remove disadvantages in the present method of exciting such machinery, which disadvantages include complexity of windings and connections, and therefore unnecessary outlay.

According to the present invention, the necessary or desired control of strength of the exciting current, and of the phase, is effected outside the machine to be regulated by the use of a single or polyphase commutator exciting machine, which is regulated to cause the desired strength of current of the proper phase to pass to the machine being regulated, complex windings, compensating windings and the like upon the main machine being thereby avoided.

The invention briefly consists in the employment of alternating current commutator machines as exciters for alternating current commutator machines.

Referring to the accompanying drawings, the improvements constituting the present invention are represented diagrammatically in various forms in Figures 1 to 6, in which—

Figure 1:
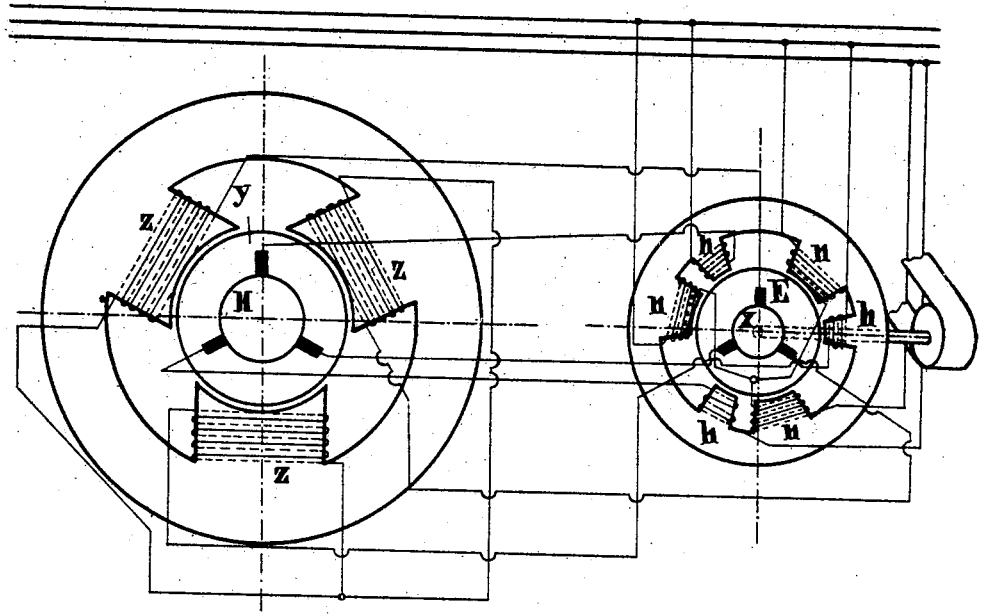
Figure 2:
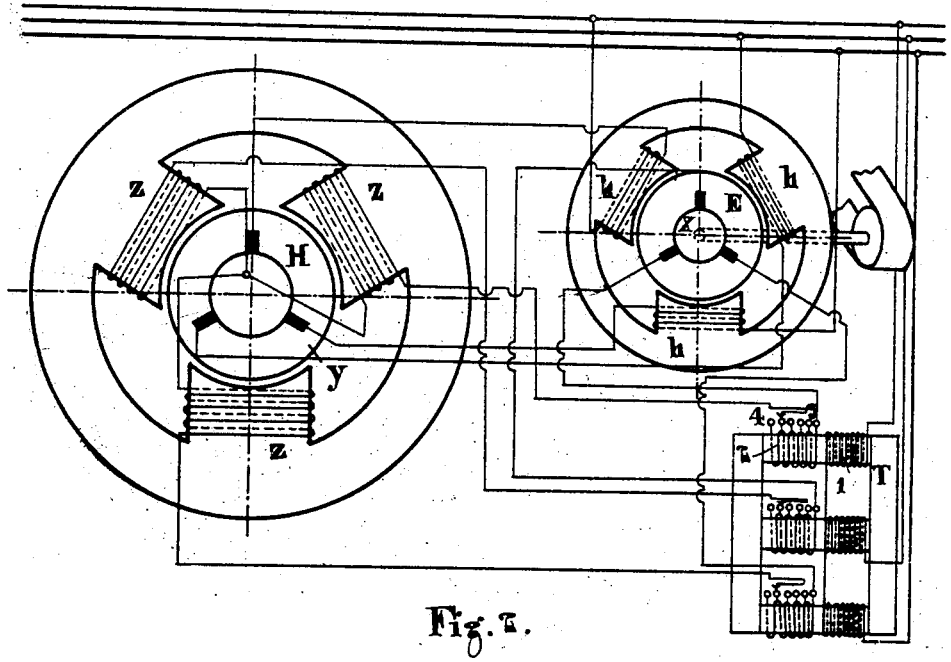
Figure 3:
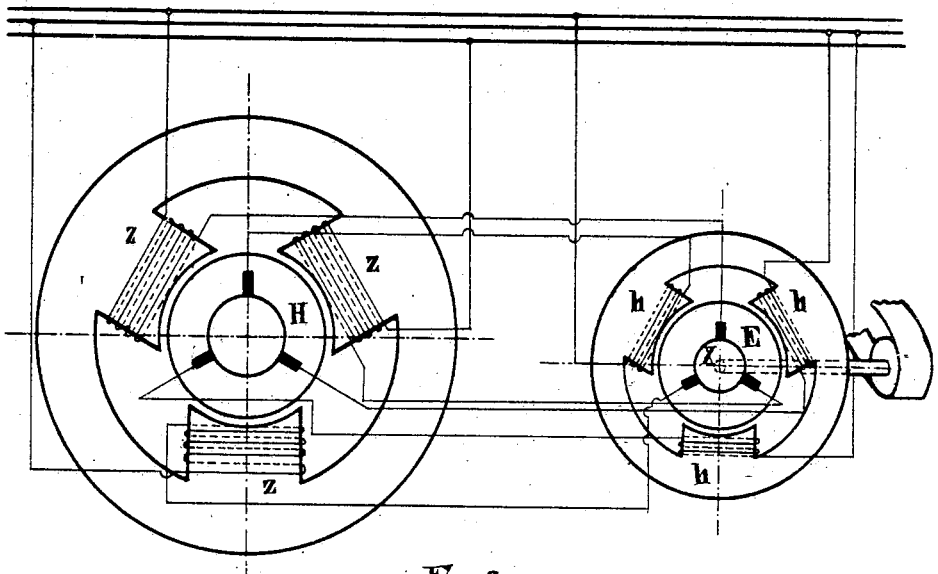
Figure 4:
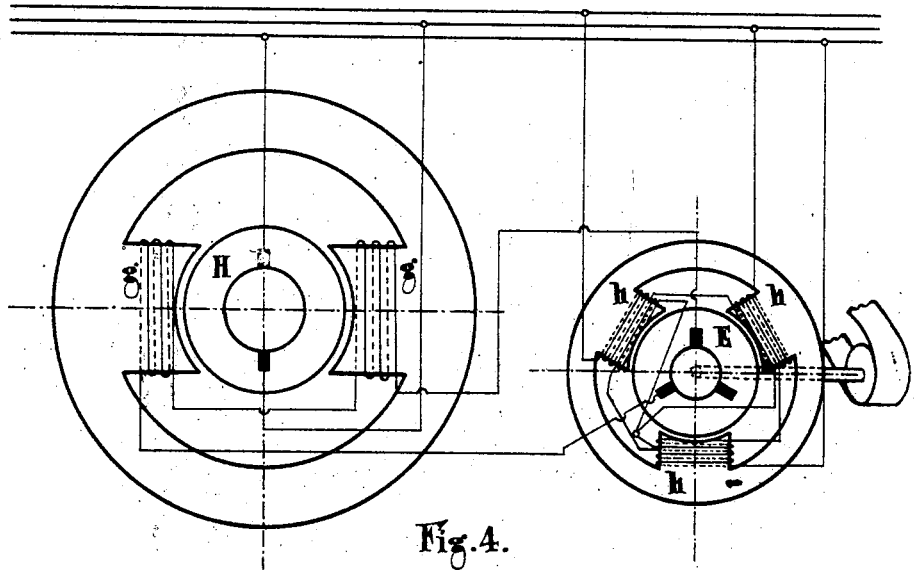
Figure 5:
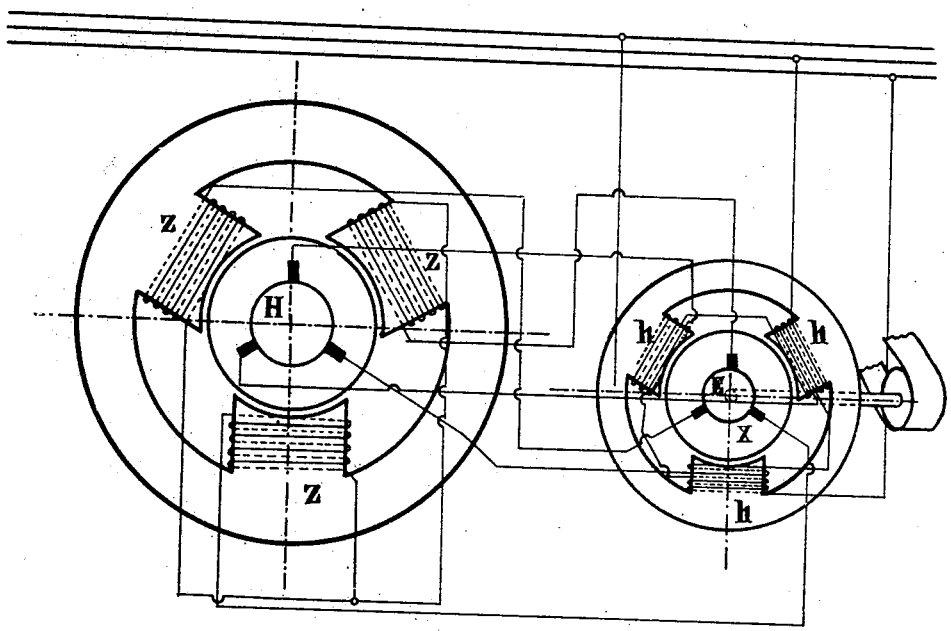

Fig. 1 represents a three-phase commutator machine provided with an exciter effecting sole control. Fig. 2 is a modification of the form of Fig. 1, in which a transformer is used in conjunction with the exciter. Fig. 3 is a modification in which the exciting energy is taken from the mains direct, and the exciter only acts to effect control. Fig. 4 is a modification in which a single phase machine is excited by a polyphase machine suitably connected. Fig. 5 shows another exciter arrangement where the excitation of the exciter is proportional to the brush currents of the main machine; and Fig. 6 an arrangement wherein the series exciting winding on the main machine is aided or weakened by an auxiliary shunt winding fed from the exciter.

The exciting windings of alternating current commutator machines are for various reasons dearer than in direct current machines. In direct current machines the shunt excitation can, for instance, be modified by inserting in the shunt field circuit resistances which may be varied at will. This method is very simple. It can not be employed in an alternating current machine, because the insertion of the resistance would also produce a shifting of the phase of the excitation. On the contrary, it is necessary in alternating current shunt machines to vary the number of turns in order to modify only the magnitude of the shunt excitation while its phase remains the same. It is therefore necessary to provide the field windings with intermediate connections whereby the number of exciting windings receiving current may be varied. Furthermore if it is desired to alter the phase of the exciting current irrespective of its magnitude, it is necessary to combine the exciting windings in a suitable manner, and the necessary number of intermediate connections with the exciting windings is increased. In the case of alternating current machines furnished with compound excitation in which it is required to control the phase and magnitude of the exciting currents the complication of the intermediate field winding connections is still greater. All these disadvantages are avoided according to the present invention.

Instead of varying the number of exciting turns, I employ, according to my present invention, fixed windings on the main machine which I excite by currents of correct phase and magnitude supplied by a separate exciter, itself furnished with exciting windings, and driven by any desired means, such as a belt and pulley.

It is often possible to use entirely or partially the energy of the mains for exciting the shunt field windings of the machines. In this case the exciting machine has only to furnish the series excitation in the necessary phase or to control the shunt excitation. It may also be advantageous to control the shunt excitation by an exciter transformer, and to have the series excitation furnished by the exciter. In these two last named arrangements the series and shunt excitation fields act in the most favorable manner.

Referring to Figs. 1 to 6, H in each case designates the main machine, and E the exciter. In the example shown in Fig. 1, the motor H is a three phase commutator machine, provided with an exciter E, which is also a three phase commutator machine. The latter is excited by the series poles $h$ and the shunt poles $n$, which are provided with corresponding windings, that is to say, the windings upon the poles $h$ are connected to the mains and to the motor armature $y$, and the windings on the poles $n$ are merely shunt windings connected in star. The armature $x$ of the exciter is connected to the field windings $z$ of the main motor H. Here the shunt and series excitations are combined in the exciter E, whereby a compounding action is produced by the excitation being influenced both by the voltage in the mains and by the rotor current of the main machine. If, for instance, this current decreases, then the voltage of the exciter also decreases, thus weakening the field of the main machine. Since the excitation of the field poles of the exciter is derived from two separate groups of ampere-turns, provision must be made to prevent the occurrence of "transformer interaction". For this reason the main and shunt current coils of the exciter are in Fig. 1 arranged upon separate poles, whereas in the remaining figures the difficulty is otherwise solved, as is readily evident.

The arrangement shown in Fig. 2 has the same object as that shown in Fig. 1, the shunt exciting energy, however, being taken from the secondary of a transformer T whose primary is supplied from the mains. Thus in this case the primary windings 1 of the transformer T are connected in star to the mains, and the secondary windings 2 are connected to the armature $x$ of the exciter E, the poles $h$ of which are excited by the rotor or brush current from the armature $y$ of the machine H. The windings 2 are provided with spaced contacts 3, and adjustable contacts 4 connected to the field windings $z$ of the machine H are adapted to co-act with the contacts 3, to effect the desired or necessary adjustment. The brush currents of the exciter pass through the secondary coils 2 of the transformer T and are influenced by the main voltage impressed on the primary winding thereof. The excitation of the main machine is, therefore, similar to that provided by the arrangement shown in Fig. 1, the series component being supplied by the exciter and the shunt component by the mains, through the transformer T.

The arrangement shown in Fig. 3 is a slightly modified form of that shown in Fig. 1. In this case, however, the windings $z$ on the machine H have one terminal connected to the mains, and the other to the armature $x$ of the exciter E, which is excited by windings upon the poles $h$, connected between the brushes of the main machine and the mains, and, therefore, having a series characteristic in proportion to the rotor or brush currents of the main machine. The exciter E in this case acts merely to determine the exciting current received from the mains by the coils $z$ of the main machine.

In Fig. 4 there is indicated one method of exciting a single phase commutator machine H by a polyphase exciter E whose brush current excites the field coils $g$ of the main machine. The field excitation of the exciter is derived from the mains, and the field coils are so arranged upon the poles $h$ that by phase combination the correct phase angle is given to the brush current.

In Fig. 5 there is shown an exciter arrangement of a type similar to that of Fig. 1, wherein the series excitation is adjusted by the exciter E, in which, as in the last form, a plurality of phases are combined upon the poles $h$ of the exciter. The armature $x$ of the exciter is in direct connection with one terminal of the windings $z$ of the machine H, and these windings are shown connected in star. The field windings of the exciter have one terminal connected to the mains and the other to the brushes of the main machine, whereby in operation the rotor current of the main machine excites the machine E which in turn supplies the desired excitation to the main machine. Thus, the excitation of the main machine is influenced indirectly by its rotor current.

Figure 6:
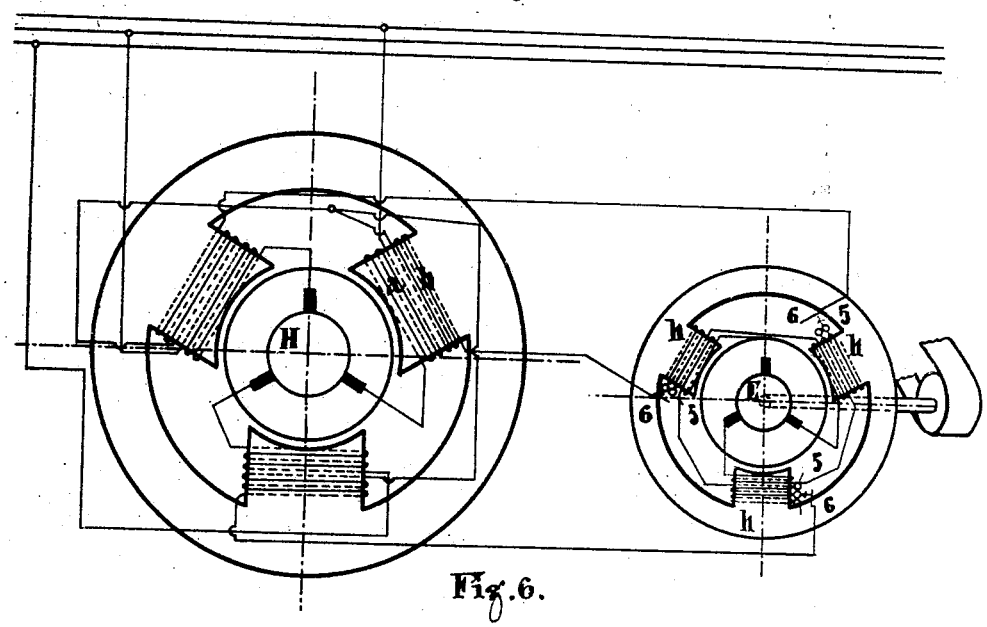

Fig. 6 shows an arrangement wherein the series exciting winding proper $a$ is aided or weakened by the auxiliary winding $b$. The exciter E again produces the correct angle for the shunt excitation of the main motor by a suitable combination of the phases which excite it. Thus it will be seen that each pole $h$ has upon it the windings of two phases, and the windings of one phase on each are provided with spaced contacts 5 co-acting with which are adjustable contacts 6 in direct connection with the windings $b$ on the motor H whereby the desired regulation can be attained. It will be seen that all these examples operate upon the same principle, that is, to render the construction cheaper, by effecting control of the excitation of the main machine, not by changing the number of the exciting turns, or by changing the current connections of them, but by furnishing the exciting currents, to an exciting winding already designed by the correct phase and with the desired ampere turns, by means of a separate exciting machine which is adapted to be more readily controlled.

What I claim as new and desire to secure by Letters Patent of the United States, is:—

1. In combination, a main alternating current commutator machine, and an alternating current commutator exciter in connection therewith, each machine being provided with exciting windings, electrical connections from the brushes of said exciter to the exciting windings of said first-named machine, and electrical connections from the brushes of said first-named machine to the exciting windings of the exciter.

2. In combination a polyphase commutator machine and a polyphase commutator exciter therefor, compounding field exciting windings in connection with said exciter and leads joining the terminals of said main commutator machine to said compounding windings; as set forth.

3. In combination, a polyphase commutator machine and a polyphase commutator exciter, means for determining the excitation of the first-named machine by the exciter, and means for exciting the latter machine from the brushes of said first-named machine.

4. In combination, a polyphase commutator machine and a polyphase commutator exciter, means for determining the excitation of the first-named machine by the exciter, and means for exciting the latter machine with a current proportional to the brush current of the first-named machine.

5. In combination, a polyphase commutator machine, a polyphase commutator exciter, and polyphase mains, means for determining the excitation of the first-named machine by the exciter, and means for exciting the latter partly from the mains and partly with a current proportional to the brush current of the first named machine.

6. In combination, a main polyphase commutator machine, a polyphase commutator exciter, electrical connections from the commutator of the exciter to the exciting windings of the main commutator machine, polyphase mains, electrical connections between said mains and one terminal of certain of the exciting windings of the exciter and electrical connections from the other terminals of said exciting windings to the commutator of said main commutator machine, and further electrical connections between the other exciting windings of the exciter and said mains.

7. In combination, a main polyphase commutator machine including a commutator and exciting windings, a polyphase commutator exciter including a commutator and exciting windings, electrical connections between the commutator of said exciter and the exciting windings of the main commutator machine, polyphase mains electrically connected to the brushes of said main commutator machine, certain of the exciting windings of the exciter being connected in shunt to said mains, other exciting windings on said exciter connected in series with the leads between the commutator of said main commutator machine and said mains, the shunt exciting windings of said exciter being interconnected, and the exciting windings of said main commutator machine being also interconnected.

In testimony whereof I have hereunto set my hand in presence of two witnesses.

ARTHUR SCHERBIUS.

Witnesses:
JOSEPH SIMON,
MEYER DELIUS.

---

Correction in Letters Patent No. 1,114,534.

It is hereby certified that in Letters Patent No. 1,114,534, granted October 20, 1914, upon the application of Arthur Scherbius, of Baden, Switzerland, for an improvement in "The Excitation of Dynamo-Electric Commutator-Machines," an error appears in the printed specification requiring correction as follows: Page 2, line 122, for the word "by" read *for;* and that the said Letters Patent should be read with this correction therein that the same may conform to the record of the case in the Patent Office.

Signed and sealed this 17th day of November, A. D., 1914.

[SEAL.]

R. F. WHITEHEAD,

*Acting Commissioner of Patents.*